Dec. 11, 1923.

W. J. HEINRITZ 1,477,263

CONTROL OF FURNACES

Filed April 8, 1918

INVENTOR
Walter J. Heinritz.
BY
ATTORNEYS

Dec. 11, 1923.
W. J. HEINRITZ
1,477,263
CONTROL OF FURNACES
Filed April 8, 1918
2 Sheets-Sheet 2
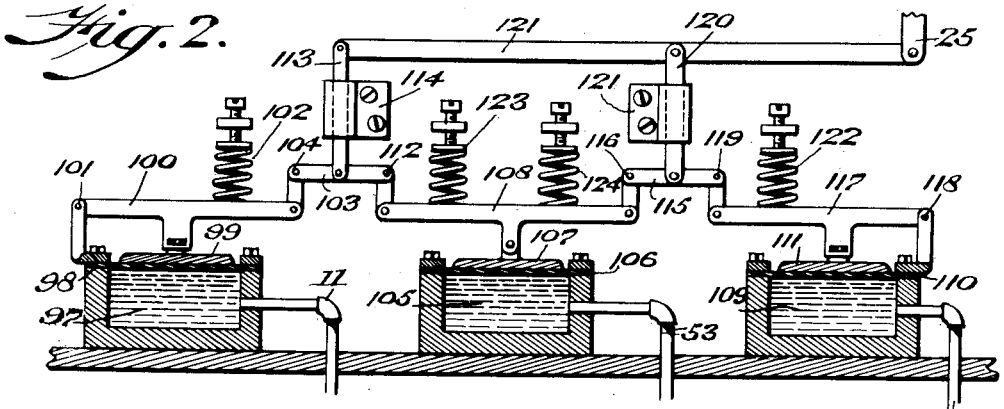
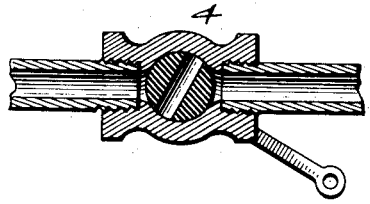
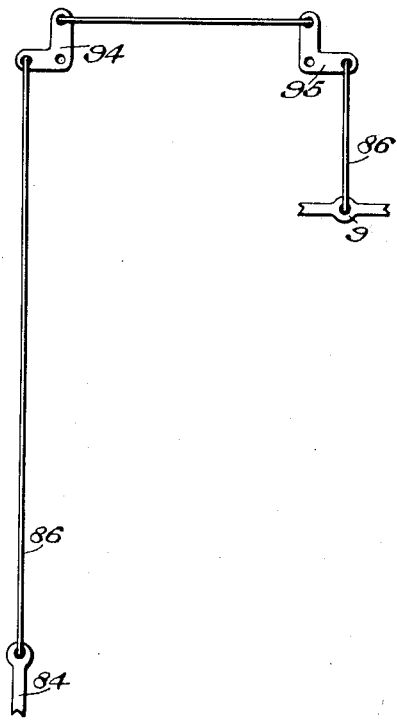

Patented Dec. 11, 1923.

1,477,263

UNITED STATES PATENT OFFICE.

WALTER J. HEINRITZ, OF NORRISTOWN, PENNSYLVANIA.

CONTROL OF FURNACES.

Application filed April 8, 1918. Serial No. 227,214.

*To all whom it may concern:*

Be it known that I, WALTER J. HEINRITZ, a citizen of the United States, residing at Norristown, in the county of Montgomery, State of Pennsylvania, have invented a new and useful Control of Furnaces, of which the following is a specification.

The object of this invention is to control the fuel input to a furnace by means of regulation of the motor driving a stoker and also at the same time regulating the amount of air supplied to the furnace through a regulator which is governed by and susceptible to the velocity of steam from a boiler, advantage being taken of the impact head and a negative condition. The damper is regulated by means of a controller which in turn is actuated by the above stated regulator in combination with a pressure apparatus, the source of which pressure is taken from the furnace.

The above arrangements, therefore, automatically control, by the regulation of the furnace, fuel supply, air supply to the furnace and damper control, a constant velocity of steam through a pipe, which is taken from the boiler under such control.

Other novel features of construction and advantage will hereinafter more clearly appear in the detailed description of the invention.

For the purpose of illustrating my invention, I have shown in the accompanying drawing preferred embodiments thereof, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 2 represents a detail, showing a modified construction, partly in section, of the primary regulator, in which an additional feature is made and adanvtage taken of the pressure of steam in operating the primary regulator.

Figure 3 represents a throttle or regulating valve, shown in cross section.

Figure 4 shows a system of linkages and bell cranks which could be substituted for the flexible or cable connections shown in Fig. 1.

Similar numerals of reference indicate corresponding parts.

Figure 1:
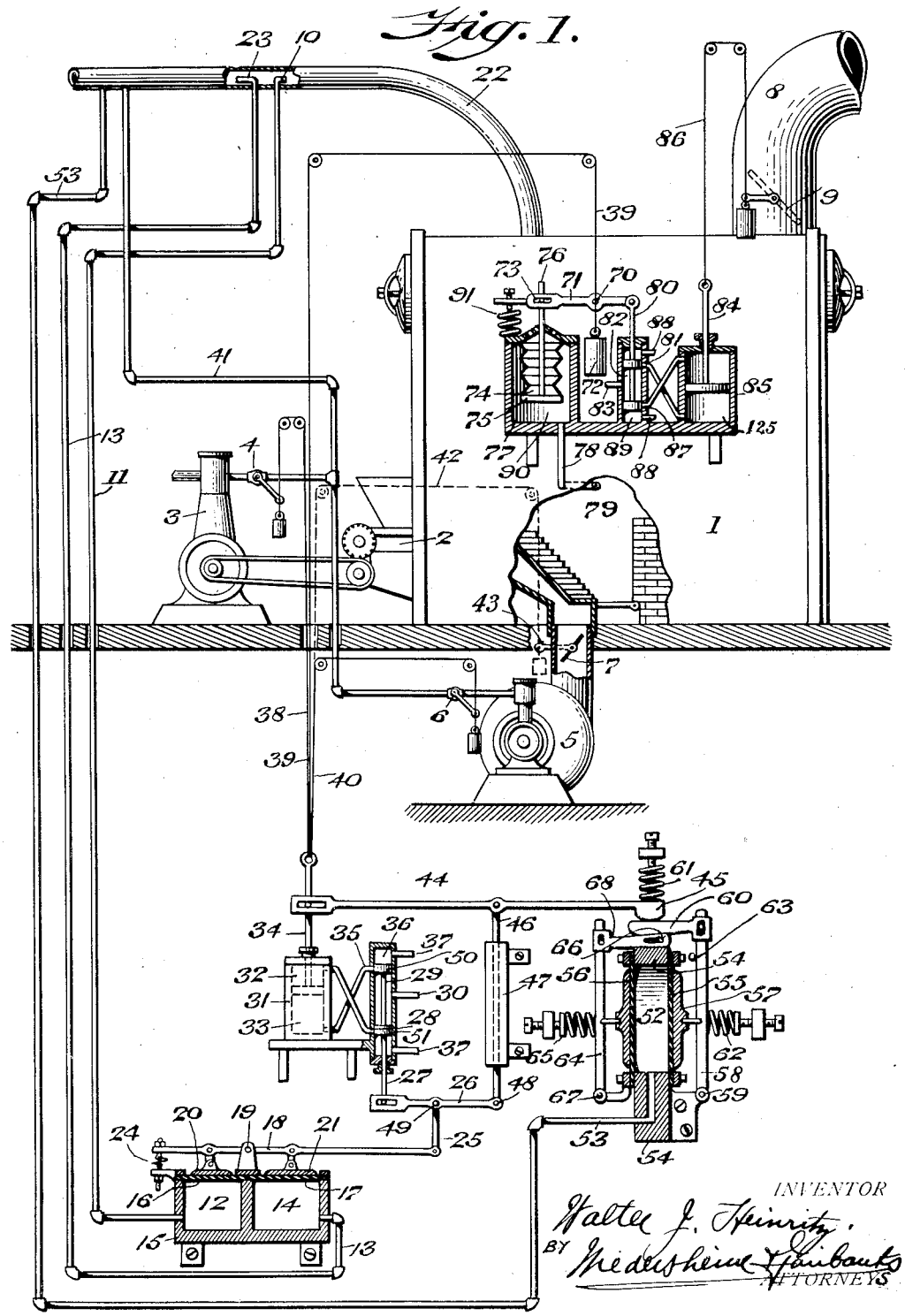
Figure 1 illustrates diagrammatically a boiler plant fitted with my improved regulation.

In the following description, I refer to a negative dynamic head and what I consider this expression to cover can best be illustrated by stating that when a tube is placed in and with its axes parallel with the flowing stream with the opening in the tube in the opposite end to the direction of the flowing stream, the velocity in the stream will cause the pressure within the tube to be lower than that outside the tube. This lower pressure in the tube is what I have termed a negative dynamic head.

Referring to the drawings.

Referring to Figure 1, 1 indicates a boiler or vapor generator which is heated by a coal fire or other source of heat, which, as illustrated, is fed by a stoker 2, which in turn is driven by a motor 3, controlled by a throttle valve 4, which is shown in cross section in Fig. 3. The air supply to the stoker is controlled by a blower 5, the motor of which is regulated by a throttle valve 6, or should the air supply to the stoker be taken from a main, the damper 7 placed in the duct would furnish equivalent regulation. The exhaust gases from the furnace are taken off through a duct 8, the regulation of which is governed by a damper 9. 10 represents the impact or positive pressure tube which transmits this pressure through the conduit 11, to the reservoir 12. 23 represents the negative pipe inserted so that the opening is with the direction of the velocity of the flow of the steam in order that the velocity of steam passing about it will produce an action causing more or less vacuum or negative pressure which, will be transmitted through a conduit 13 to the reservoir 14. These two reservoirs 12 and 14 are in a container 15 closed by flexible diaphgrams 16 and 17 respectively. The lever 18 is pivoted at 19 and attached through links to the solid pieces 20 and 21 which rest against the diaphgrams. The action of the regulator is as follows:—Due to the velocity of steam passing through the conduit 22 from boiler 1 and impinging on the impact tube 10, the impact pressure will be transmitted through the conduit 11, to the reservoir 12 in the container 15 causing a pressure against the diaphgram 16, which is in turn transmitted through the solid part 20, to the lever 18. The vacuum or negative pressure produced in the pipe 23 is transmitted through the conduit 13 to the reservoir 14, and as the static pressures in the reservoirs 12 and 14 are automatically counterbalanced by the lever 18, through the solid parts 20 and 21, the negative condition will produce a downward movement to the diaphgram 17 and incidentally 21, while the positive condition, due to impact tube will produce an upward movement of the part 20 and incidentally that part of the lever 18 beyond the pivot 19. This movement of the lever 18 can be adjusted by the movement of the spring 24. This movement caused by the action of the upward movement of the part 20 and the downward movement of part 21 in combination will cause the link 25 and the lever 26 to which it is pivoted to move downward, moving the piston rod 27 of a power motor in the same direction, uncovering the port 28 and allowing the motive fluid pressure, water or steam pressure, which is established in the space 29 through the conduit 30, to flow to the upper part of cylinder 31 in space 32, thus causing a downward movement of the piston attached to rod 34 and allowing the water in the space 33 to flow through port 35 through space 36 to the exhaust pipe 37.

The downward movement of the rod 34, will also cause a downward movement of the flexible connection 38 actuating the throttle valve 4 supplying steam to the motor 3, decreasing the speed by throttling of its supply taken through the conduit 41 from the conduit 22. The movement of the rod downward through flexible connection 40, will also cause the steam to be throttled, by the throttle valve 6, from the blower engine outfit 5, supplying air to the stoker 2. Should however, the air supply to the furnace be taken from a common main the downward movement of the rod 34 acting through flexible connection 40 and through continuation of 40, shown in dotted line 42, acting on the damper through the lever arm 43 closing the damper 7. The downward movement of rod 34 will also cause a downward movement of the lever 44 the fulcrum of which is at 45 reacting through the rod 46 which is held by the rigid sleeve 47 and will cause a downward movement at the pivot 48 of the lever 26. Such a movement would immediately react on the piston rod 27 since the pivot 49 in this case would be the fulcrum on which the lever 26 would turn and would by its action return the piston valves 50 and 51 to a middle or neutral position, preventing any further movement of the rod 34.

This is the normal operation of this regulator, which I will refer to henceforth as the primary regulator and since its action does not depend on the pressure in the steam boiler, but only according to the velocity of flow in the conduit 22, it would be naturally expected that a certain variation in pressure in the boiler 1 would follow, but to prevent an excessive high or low pressure, the reservoir 52 is added which is susceptible to the pressure in the conduit 22 through the conduit 53. This is enclosed by the part 54 and the flexible diaphgrams. Should an excessively high pressure occur, the diaphragm 55 against which rests the part 57 will cause an outward movement, causing the lever 58 which is fulcrumed at 59 to be moved outward, carrying with it the wedge shape piece 60, which in turn would cause the fulcrum 45 of the lever 44 to move upward against the action of the spring 61. The spring 62 should be calibrated to act only at a predetermined high point and the stop 63 prevents any inward movement of the lever 58. The upward action of the fulcrum 45 acting through rod 46 on the lever 26 which during the operation would be fulcrumed at 49 would cause a downward movement of the piston rod 27 which will open the port 28 to the water pressure in chamber 29, causing the piston attached to rod 34 to move downward, reacting on the throttle valves 4 and 6, closing the steam supply to the stoker and blower motors. As soon as the pressure is lowered to the setting of the spring 62, the lever arm 58 will return to its normal position against the stop 63, causing a reverse of the action stated above. Should the pressure in the boiler be lowered excessively, such action would naturally have no results as far as the action of the lever 58 is concerned, since it, as I have already stated, rests against the stop 63, but such action would react on the lever 64, since the spring 65 would be calibrated for this excessively low pressure. The stop 66 prevents the outward movement of the lever arm 64, so that the wedge 68 can move inwardly such inward movement lowering the fulcrum 45 due to the action of the spring 61. The reaction of the spring 61 will cause the rod 46 to move downwardly together with its pivot 48 thus moving the rod 27 upwardly, said rod 27 being actuated by the lever 26 which is fulcrumed at the fulcrum point 49. Such action would uncover the port 35 and the pressure of the water in the chamber 29 will immediately cause the rod and the piston attached to rod 34 to move upward and through this motion transmitted to the valves 4 and 6, opening them, admitting more steam to the motors attached to the stoker and blower motors, thus raising the pressure, due to the additional fuel and air supply. As soon as this low pressure has been overcome, a reverse action will take place in the lever 64 moving it outward to its normal position which is resting against the stop 66.

It will be noted from the foregoing that it is the intention of this invention to provide a constant velocity of steam in the conduit 22 and to provide this at the expense of a constant steam pressure, but it is the intention to prevent excessively high and excessively low steam pressures. This apparatus is intended to be used more particularly where there is more than one boiler in order that a constant velocity of the steam can be carried. Constant temperatures, naturally resulting within the boilers would give the most efficient point at which that boiler can be operated, but should anything abnormal occur, such as the accidental shutting off of the main valve to the boiler or the sudden interruption of the steam flow in the line from the boiler, excessive pressures must be prevented. On the other hand should by accident the velocity of the steam be not great enough to furnish steam sufficient for maintaining the normal steam pressure in the boiler, when operating in conjunction with other boilers, an excessive low pressure should be prevented. In other regulators it has always been the practice to attempt to govern the boilers at normal or about normal steam pressures, but from the foregoing it will be understood that such operation is not the intention of this invention.

On the other hand, when this regulator is used with a single boiler, the steam pressure fluctuates between the maximum and minimum pressures set.

The damper 9 is regulated by a controller or secondary regulator which is actuated by the primary regulator through the flexible connection 39 attached at the pivot 70 to the lever 71 and held in place by the weight 72. The downward action of the rod 34 which will cause the motors attached to the stoker and the air blower to decrease in speed, will cause an upward movement of the lever 71 at the pivot 70 and fulcrumed at 73. 74 is a flexible bellows closed at the bottom 75 to which the rod 76 is attached which carries the fulcrum 73. This bellows is in a closed container 77 opened at the bottom through the conduit 78 to the pressure inside the furnace 79. The lever 71, fulcrumed at 73 will cause the pilot rod 80 to move upward, opening the port 81 to the action of the motive fluid, for example, water pressure in chamber 82, supplied through the conduit 83. This pressure flowing thru the port 81 will cause a pressure underneath the piston due to flow of water under the piston 85, raising the piston and incidentally the rod 84 to which it is attached and transmitting this motion through the flexible connection 86 to the damper 9, causing it to close. The piston in raising will cause the water above it to flow through port 87 and exhaust into chamber 89 and through exhaust conduit 88. Should, however, the damper 9 close to such an extent as to cause a pressure in the furnace 79, this pressure would be transmitted through conduit 78 to chamber 90, causing a contraction of the bellows 74 and an upward movement of the base 75 and the rod 76, which would be transmitted through the lever 71, pivot 70 acting as a fulcrum, causing a downward movement of piston rod 80 and a neutral position of the pilot valve shutting off the flow of water to the cylinder 125 and stopping further movement of the rod 84. On the other hand should a greater pressure still exist the pilot valve stem 80 would continue to travel downward, causing water to flow from the chamber 82 thus causing a pressure above the piston 85, reacting through the means of the flexible connection 86 on the damper 9, causing it to open until the pressure is again normal in the furnace 79. By means of a spring 91, properly calibrated a predetermined pressure may be obtained in chamber 90. Instead of flexible connections 86, bell cranks 94 and 95 may be used and a solid connection made possible by means of rods, connecting the bell cranks, see Fig. 4. The same is true of the flexible connections 38, 39 and 40 where bell cranks may be inserted in the system and solid rods used.

Instead of flexible diaphragms 16 and 17 closing chambers 12 and 14 respectively, bellows similar to 74 may be used, the rod 76 making connections to the lever 18.

Another form of primary controller is shown in Fig. 2 in which the impact tube 10 pressure is transmitted through conduit 11 to the chamber 97 closed by a flexible diaphragm 98 against which rests a solid part 99, acting against a lever 100, fulcrumed at 101 and acting against spring properly calibrated 102, and thereby causing an upward movement of the lever 103 at pivot 104. A pressure line similar to conduit 53 on Fig. 1 is inserted in the conduit 22 transmitting the pressure through 53 Fig. 2 to a chamber 105 which is closed by a flexible diaphragm 106, causing a pressure against a solid part 107 and a lever 108. The minus pressure tube 23 on Fig. 1 is transmitted through the conduit 13 to a chamber 109, Fig. 2, closed by flexible diaphragm 110, causing a difference of pressure between the static head as existing on account of the tube 23, Fig. 1, against the solid piece 111, Fig. 2. The upward movement due to the pressure in the chamber 105 on the part 107 and the lever 108 will move the lever 103 upward at its pivot 112, but the upward movement of the rod 113 which slides through the sleeve 114, will be the difference between the pressure in chamber 105 and chamber 97, which is in the positive direction and therefore will be upward. On the other hand, an upward movement of the lever 108 will cause an upward movement of the link 115 at the pivot 116 and the pressure upward caused by the pressure in the chamber 109 on the lever 117, fulcrumed at 118 on the link 115 will also have a tendency to move upward the link 115 at the pivot 119, and the movement of the rod 120 will be the difference in the pressure between that in the chamber 105 and chamber 109. The pressure in chamber 109 would be the difference between the static pressure in the conduit 22, Fig. 1, and the negative pressure due to the velocity in the tube 23, Fig. 1, therefore the movement of the rod 120 through the sleeve 121 would be downward, provided that springs 122, 123 and 124 balance the normal boiler pressure. The upward movement of the rod 113 and the downward movement of the rod 120 on the lever 121 on which is pivoted the link 25 which is the link 25 on Fig. 1, will give the same movement and in the same direction as the lever 18 in Fig. 1. The mechanism other than that as far as pilot valve, cylinders, flexible connections to the throttle valve to the motors on the stoker and blower and also to the secondary controller pressure regulating device and linkages would be the same as that shown in Fig. 1. The springs 102, 122, 123 and 124 could be properly calibrated to act against the pressures at predetermined points. It will be apparent from the foregoing that I employ controlling mechanism which includes a primary regulator which controls the stoker and the air feeding means and a secondary regulator which controls the damper regulating the exhaust from the furnace, and the primary and secondary regulators are dependent upon each other to produce the requisite results, the primary regulator being controlled by variations in the positive and negative dynamic heads in the steam main leading from the boiler. The primary regulator includes the parts 25 to 51 inclusive. The means co-operating with the primary regulator to prevent an excessive high or low pressure includes the parts 51 to 68 inclusive. The secondary regulator includes the parts 70 to 78 inclusive, 80 to 90 inclusive, and 125.

Although I have shown the principle on which I accomplish the automatic regulation of a boiler furnace, it is understood that the apparatus may have other arrangements by which the invention can be carried out. It will be apparent from the foregoing that it is the object of my invention to maintain a constant velocity flow in the main steam pipe. I of course appreciate that under the conditions of a fluctuating load more than one boiler would be necessary. For example, one boiler would be carrying constantly a certain definite load while the other boiler would be taking a fluctuating load.

It will now be apparent that I have devised a novel and useful construction of a control of furnaces which embodies the features of advantage enumerated as desirable in the statement of the invention and the above description.

Having thus described my invention, what I claim as new and desire to secure by Letters Patent, is:—

1. In a furnace controlling mechanism, in combination, a boiler, a main for conveying vapor from said boiler, a furnace, a gas discharge duct from said furnace, a damper in said gas discharge duct, an air supply to said furnace, and controlling mechanism including the following instrumentalities:—a primary regulator controlling said air supply, a secondary regulator susceptible to the pressure of gas in said furnace, operatively connected with said damper to control it, and adjusted by said primary regulator, means sensitive to changes of velocity in said main for adjusting said primary regulator, and means susceptible to the pressure in said main to vary the action of said primary regulator and thereby cause said controlling mechanism to prevent high pressure in said main.

2. In a furnace controlling mechanism, in combination, a boiler, a main for conveying vapor from said boiler, a furnace, a gas discharge duct from said furnace, a damper in said gas discharge duct, an air supply to the furnace, and controlling mechanism including the following instrumentalities:—a primary regulator controlling said air supply, a secondary regulator adjusted by said primary regulator and sensitive to the pressure of gas within the furnace, said secondary regulator being operatively connected to said damper to adjust it, and means sensitive to changes of velocity in said main for adjusting said primary regulator.

3. In a furnace controlling mechanism, in combination, a boiler, a main for conveying vapor from said boiler, a furnace, a gas discharge duct from said furnace, a damper in said gas discharge duct, an air supply to the furnace, and controlling mechanism including the following instrumentalities:—a primary regulator controlling said air supply, a secondary regulator adjusted by said primary regulator, controlling said air supply, and sensitive to the pressure of gas within the furnace, said sceondary regulator being operatively connected with said damper to adjust it, means sensitive to changes of velocity in said main for adjusting said primary regulator, and means susceptible to the pressure in said main to vary the action of said primary regulator and thereby cause said controlling mechanism to prevent high and low pressure in said main.

4. In a furnace controlling mechanism, in combination, a boiler, a main for conveying vapor from said boiler, a furnace, a gas discharge duct from said furnace, a damper in said gas discharge duct, a stoker supplying fuel to said furnace, an air supply to the furnace, and controlling mechanism including the following instrumentalities:—a primary regulator controlling said air supply and said stoker, a secondary regulator sensitive to pressure of gas within the furnace and operatively connected with said damper to adjust it, said primary regulator being connected to said secondary regulator to adjust it, and means sensitive to changes of velocity in said main for adjusting said primary regulator, and means susceptible to pressure in the main to vary the action of said primary regulator and thereby cause said controlling mechanism to prevent high pressure in said main.

5. In a furnace controlling mechanism, in combination, a boiler, a main for conveying vapor from said boiler, a furnace, a gas discharge duct from said furnace, a damper in said gas discharge duct, a stoker supplying fuel to said furnace, an air supply to said furnace, and controlling mechanism including the following instrumentalities:—a primary regulator controlling said air supply and said stoker, a secondary regulator sensitive to pressure of gas within said furnace and operatively connected with said damper to adjust it, said primary regulator being connected to said secondary regulator to adjust it, means sensitive to changes of velocity in said main for adjusting said primary regulator, and means susceptible to pressure in said main to vary the action of said primary regulator and thereby cause said controlling mechanism to prevent low pressure in said main.

6. In a furnace controlling mechanism, in combination, a boiler, a main for conveying vapor from said boiler, a furnace, a gas discharge duct from the furnace, a damper in said gas discharge duct, an air supply to said furnace, and controlling mechanism including the following instrumentalities:—a primary regulator controlling said air supply, a secondary regulator adjusted by said primary regulator and sensitive to the pressure of gas within said furnace, said secondary regulator being operatively connected with said damper to adjust it, and means sensitive to changes in velocity in said main for adjusting said primary regulator.

7. In a furnace controlling mechanism, in combination, a main for conveying vapor from said boiler, a furnace, a gas discharge duct from the furnace, a damper in said discharge duct, an air supply to said furnace, and controlling mechanism including the following instrumentalities:—a primary regulator controlling said air supply, a secondary regulator sensitive to pressure of gas within the furnace and operatively connected to said damper to adjust it, means sensitive to changes of velocity in said main for adjusting said primary regulator, and means susceptible to pressure in the main to vary the action of said primary regulator and thereby cause said controlling mechanism to prevent high pressure in said main.

8. In a furnace controlling mechanism, in combination, a boiler, a main leading from said boiler, air feeding means, fuel feeding means, a furnace, a gas discharge duct from said furnace, and controlling mechanism including the following instrumentalities:—a primary regulator controlling said fuel feeding means and said air feeding means, a secondary regulator adjusted by said primary regulator and controlling said gas discharge duct, said secondary regulator being subjected to the pressure within the furnace, means sensitive to changes of velocity in said main for directly controlling the action of said primary regulator, and means susceptible to pressure in said main to vary the action of said primary regulator and thereby cause said controlling mechanism to prevent high or low pressures in said main.

9. In a furnace controlling mechanism, in combination, a furnace, a boiler, a main leading from said boiler, and controlling mechanism including the following instrumentalities:—a primary regulator, ducts leading from said primary regulator and extending into said main, one of said ducts being bent in the direction of flow and the other duct being bent in a direction opposite to the direction of flow in said main, air feeding means controlled by said primary regulator, a secondary regulator controlled by said primary regulator, a gas discharge duct from said furnace controlled by said secondary regulator, and means controlled by the pressure in said main to vary the action of said primary regulator and thereby cause said controlling mechanism to cause the pressure in said main to be within a defined range of pressure.

10. In a furnace controlling mechanism, in combination, a furnace, a boiler, a main for conveying vapor from said boiler, a gas discharge duct from said furnace, a damper in said gas discharge duct, a stoker, a primary regulator controlling said stoker, a secondary regulator sensitive to pressure of gas within the furnace and operatively connected with said damper to adjust it, said primary regulator being connected with said secondary regulator to adjust it, means sensitive to changes in velocity in said main for adjusting said primary regulator, and means responsive to variations in the static and negative dynamic heads in said main to vary the action of said primary regulator to prevent high and low pressure in said main.

11. In a furnace controlling mechanism in combination, a boiler, a main for conveying vapor from said boiler, a furnace, a gas discharge from said furnace, a damper in said gas discharge, a stoker supplying fuel, air feeding means, and controlling mechanism including the following instrumentalities:— a primary regulator controlling the action of said stoker and said air feeding means, a secondary regulator adjusted by the primary regulator and controlling said gas discharge duct, said secondary regulator being subjected to the pressure within the furnace, means sensitive to the change of velocity in said main for directly controlling the action of said primary regulator, and means susceptible to pressure in said main to vary the action of said primary regulator and thereby prevent high and low pressures in said main.

12. In a furnace controlling mechanism, in combination, a boiler, a main leading from said boiler, air feeding means, fuel feeding means, a furnace, a gas discharge duct from said furnace, and controlling mechanism including the following instrumentalities:—a primary regulator controlling said fuel feeding means, a secondary regulator adjusted by said primary regulator and controlling said gas discharge duct, said secondary regulator being subjected to the pressure within the furnace, means sensitive to changes of velocity in said main for directly controlling the action of said primary regulator, and means susceptible to pressure in said main to vary the action of said primary regulator and thereby cause said controlling mechanism to prevent high or low pressures in said main.

13. In a furnace controlling mechanism in combination, a boiler, a main for conveying vapor from said boiler, a furnace, a gas discharge from said furnace, a damper in said gas discharge, a stoker supplying fuel, air feeding means, and controlling mechanism including the following instrumentalities:—a primary regulator controlling the action of said stoker, a secondary regulator adjusted by the primary regulator and controlling said gas discharge duct, said secondary regulator being subjected to the pressure within the furnace, means sensitive to the change of velocity in said main for directly controlling the action of said primary regulator, and means susceptible to pressure in said main to vary the action of said primary regulator and thereby prevent high and low pressures in said main.

WALTER J. HEINRITZ.

Witnesses:
E. HAYWARD FAIRBANKS,
C. D. McVAY.